United States Patent Office 3,632,779
Patented Jan. 4, 1972

3,632,779
METHOD USING (DIALKYLAMINOETHOXY) HALOMETHOXYANILINES FOR ALLEVIATING CARDIAC ARRHYTHMIAS
Franklin N. Marshall, Indianapolis, Ind., assignor to The Dow Chemical Company, Midland, Mich.
No Drawing. Filed Mar. 6, 1969, Ser. No. 804,985
Int. Cl. A61k 27/00
U.S. Cl. 424—330                                   7 Claims

ABSTRACT OF THE DISCLOSURE

A method useful for alleviating cardiac arrhythmias such as tachycardias in animals by administering to an animal an antiarrhythmic amount of a (dialkylaminoethoxy)halomethoxyaniline or a pharmaceutically-acceptable salt thereof.

SUMMARY OF THE INVENTION

This invention is concerned with a method and compositions for treating cardiac arrhythmias in animals and is particularly directed to a method and compositions for treating arrhythmic mammals by the administration thereto of an antiarrhythmic amount of a (dialkylaminoethoxy)halomethoxyaniline or a pharmaceutically-acceptable salt thereof, the (dialkylaminoethoxy)halomethoxyaniline corresponding to the formula

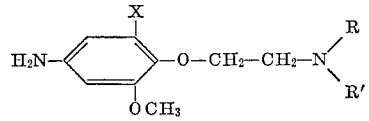

wherein X represents chlorine or bromine and R and R' each independently represent methyl or ethyl.

It is an object of the invention to provide a method for the treatment of cardiac arrhythmias in animals. It is another object of the invention to provide novel compositions which can be employed to combat cardiac arrhythmias in mammals. It is a further object of the invention to provide pharmaceutical compositions comprising one or more antiarrhythmic compounds of high potency. Further objects and advantages will become apparent claims.

It has been found that substituted aniline compounds corresponding to the above formula and the pharmaceutically-acceptable salts thereof have powerful antiarrhythmic activity when administered to animals, and in particular, to arrhythmic mammals. As employed herein, the phrase "pharmaceutically-acceptable salts" refers to non-toxic acid addition salts of the substituted aniline compounds, the anions of which are relatively innocuous to animals at dosages consistent with good antiarrhythmic activity so that the beneficial effects of the free base are not vitiated by side effects ascribable to the anions. Appropriate pharmaceutically-acceptable salts include those derived from mineral acids such as hydrochloric, hydrobromic, sulfuric and nitric acid and from organic acids such as acetic, lactic, maleic, succinic, fumaric, glutaric, citric, malic and tartaric acids and the like.

The (dialkylaminoethoxy)halomethoxyaniline compounds employed in the method and compositions of the invention are crystalline solids which are of varying degrees of solubility in water and in organic liquids such as chlorinated hydrocarbons, chlorinated benzenes, alcohols and alkylbenzenes.

The substituted aniline compounds can be prepared by the reduction of the corresponding 1-halo-2-(dialkylaminoethoxy)-3-alkoxy-5-nitrobenzene by the procedure disclosed by Page and Clinton, Journal of Organic Chemistry, 27:218 (1962). The pharmaceutically-acceptable salts of the substituted aniline compounds can be conveniently prepared by dissolving the corresponding free base compound in an alcohol and adding an excess of an alcoholic solution of an acid such as hydrochloric acid, acetic acid, maleic acid or the like to precipitate the pharmaceutically-acceptable salt. The salt can be separated by filtration and purified by recrystallization.

The free base substituted aniline compounds can be prepared by hydrolysis of the pharmaceutically-acceptable salts in aqueous base and can be separated by extraction with organic solvents and purified by recrystallization.

In accordance with the invention, an anti-arrhythmic amount of a substituted aniline compound of the invention or a pharmaceutically-acceptable salt thereof is administered to an animal. The terms "arryhthmic" and "arrhythmia" as employed herein refer to irregular cardiac activity characterized by irregular beating of the heart, that is, non-rhythmic heart beat. Such arrhythmias involve substantial departures from the normal regular, substantially sinus; that is, sinusoidal, heart beat. Arrhythmias are generally beyond the normal increased, but still substantially regular, heart beat rate resulting from physical activity. The term is inclusive of the conditions described by terms such as ventricular fibrillation, ventricular tachycardia, atrioventricular nodal beats, auricular flutter, auricular fibrillation or premature ventricular contractions. The terms "arrhythmic animal" and "arrhythmic mammal," as employed in the present specification and claims, mean and refer to animals suffering cardiac arrhythmias. Such arrhythmias can be the result of physiological or pathological conditions, can be brought about by physical conditions such as electrical stimulation or physical injury or they can be brought about by pharmacological effects such as the administration of compounds such as digitalis or similar compounds such as ouabain, acetyl strophanthidin, deslanatoside C or digitoxin; epinephrine; ergot; chloroform; cyclopropane and the like compounds having cardiac stimulant and arrhythmia-inducing activity or side effects.

In the practice of the invention, the substituted aniline compound is normally incorporated in a pharmaceutical carrier and the resulting composition is administered internally to an arrhythmic animal. In the present specification and claims, "pharmaceutical carrier" refers to known pharmaceutical excipients which are substantially non-toxic and non-sensitizing at dosage levels consistent with good antiarrhythmic activity. The active ingredient is preferably administered both parenterally in the form of liquid injectable solutions or suspensions, and orally in the form of solid compositions which can be prepared by known techniques such as tableting and encapsulation. Suitable pharmaceutical carriers which can be employed for formulating the solid compositions include starch, lactose, glucose, sucrose, gelatin, powdered licorice, malt, rice flour, chalk, silica gel, hydroxyethyl cellulose, hydroxypropyl cellulose, magnesium carbonate, magnesium stearate and the like and compatible mixtures thereof. The substituted aniline compounds and the pharmaceutically-acceptable salts thereof can also be formulated as liquid compositions including syrups, elixirs, suspensions and emulsions for oral administration which can include liquid pharmaceutical carriers such as ethanol, water, saline, glucose syrup, syrup of acacia, mucilage of tragacanth, propylene glycol, polyethylene glycols, peanut oil, wheat germ oil, sunflower seed oil or corn oil and the like and compatible mixtures thereof. Orally-ingestable emulsions are prepared with the aid of emulsifying agents such as lecithin, sorbitan trioleate, polyoxyethylene sorbitan monooleate and natural gums such as gum acacia and gum tragacanth. Suspensions are prepared with the aid of suspending agents such as polyethylene oxide condensation products of alkylphenols or fatty acids or fatty alcohols, or cellulose derivatives such as methyl cellulose, carboxymethyl cellulose or hydroxypropylmethyl cellulose. The compositions can also contain sweetening agents such as calcium cyclamate, flavoring agents such as caramel, coloring materials, preservatives and the like.

Injectable compositions adapted for parenteral administration such as intramuscular, subcutaneous or, preferably, intravenous injection can be prepare with carriers such as water, normal saline solutions, Ringer's Injection, Lactated Ringer's Injection, dextrose solutions, ethanol, propylene glycol, liquid polyethylene glycols, fixed vegetable oils such as corn oil, peanut oil or cottonseed oil, ethyl oleate, isopropyl myristate and the like. The injectable compositions can also contain other materials such as preservatives, buffers and the like. The selection of the exact pharmaceutical carrier to be employed in any given circumstance can be carried out by routine and conventional range finding operations to arrive at formulations having the desired characteristics of physical form, ease of administration by a desired route, storage stability, etc.

The antiarrhythmic amount of a substituted aniline compound to be administered to an arrthythmic animal can vary depending upon such factors as the severity of the arrhythmia exhibited, the method and frequency of administration, the exact antiarrhythmic effect to be produced, whether or not the free base or a pharmaceutically-acceptable salt of the mixed ether compound is employed and the species, size, weight, age and physical condition of the particular animal being treated. In general, when the animal is actively exhibiting arrhythmia, it is preferred to administer the compound at an antiarrhythmic dosage rate sufficient to bring about a complete conversion of the arrhythmia to normal sinus cardiac activity. In such operations, the active compound is preferably introduced directly into the cardiovascular system of the animal to provide an antiarrhythmic concentration thereof in the blood sufficient to alleviate the arrhythmia. In a convenient procedure, the substituted aniline compound is administered by intravenous injection at an initial antiarrhythmic dosage less than that required to fully convert the arrhythmia to normal sinus rhythm, and the heartbeat of the animal is monitored as the amount of compound administered is gradually increased over a period of minutes until an antiarrhythmic amount sufficient to fully convert the arrhythmia to rhythmic cardiac activity has been administered. It is then preferred to supply the compound in periodic maintenance antiarrhythmic dosages, such administration being either by the same parenteral route, or by administration of larger antiarrhythmic dosages by another route such as orally. The maintenance antiarrhythmic dosage and mode of administration are selected to provide a more-or-less continuous antiarrhythmic concentration of the substituted aniline compound in the cardiovascular system, such concentration being sufficient to inhibit further arrhythmia. In general, the substituted aniline compound can be administered intravenously in initial dosages of from about 250 or less to about 10,000 or more micrograms per kilogram of animal body weight, providing antiarrhythmic concentrations in the cardiovascular system of about 20 or lower to about 800 or more micrograms per liter of blood. Maintenance dosages can vary widely depending upon a variety of factors such as the time and frequency of administration, the exact substituted aniline compound or compounds employed, the condition, size, age and species of the animal, the route of administration selected, the type of dosage form employed, the type and cause of the arrhythmia and the length of time during which a maintenance dose is desired. In cases in which there is little or no likelihood of recurrence of arrhythmia once conversion has been brought about, the maintenance dosage can comprise a continuation of the initial intravenous antiarrhythmic dosage for a relatively brief period. Maintenance dosages can be administered by single or multiple doses provided that the compounds are administered in an amount sufficient to provide an antiarrhythmic concentration in the blood and substantially to alleviate cardiac arrhythmia.

DESCRIPTION OF THE PREFERRED EMBODIMENTS

The following examples illustrate the invention but are not to be construed as limiting the same.

EXAMPLE 1

Ventricular tachycardia is produced according to the method of Lucchesi and Hardman (J. Pharmacol. Exptl. Therap., 132, 372, 1961) by the administration of ouabain to anesthetized dogs. In such operations, a test dog is anesthetized by the intravenous administration of pentobarbital sodium at a dosage rate of 30 milligrams per kilogram. A femoral artery is cannulated with polyethylene tubing for measurements of blood pressure. A femoral vein is similarly cannulated for administration of ouabain and administration of the test compound. Hypodermic needle electrodes are employed for recording electrocardiograms. The ouabain is administered intravenously via the cannulated femoral vein at an initial dosage of 40 micrograms of ouabain per kilogram of animal body weight. The initial dosage of ouabain is supplemented after thirty minutes by 20 micrograms of ouabain per kilogram, and by 15 micrograms per kilogram thereafter until ventricular tachycardia is detected.

After ventricular tachycardia is observed, 3-chloro-4-(2-dimethylaminoethoxy)-5-methoxyaniline hydrochloride is administered intravenously by administration of a composition containing varying amounts of the pharmaceutically-acceptable salt of the substituted aniline compound in sterile solution in water containing 0.9 percent sodium chloride. Each dose is administered slowly over a period of 15 to 30 seconds. The compound is administered at an initial dosage rate of 0.25 milligram of 3-chloro-4-(2-dimethylaminoethoxy)-5-methoxyaniline hydrochloride per kilogram of animal body weight. Blood pressure and electrocardiogram are observed for five minutes after administration and a second dose of 0.50 milligram of the test compound per kilogram is administered by a similar procedure and blood pressure and heartbeat are similarly observed for five minutes. Complete conversion of the ventricular tachycardia to normal sinsus rhythm is observed within five minutes after administration of the test compound at a dosage rate of 0.5 milligram per kilogram. The animal is then observed and the duration of the period of normal cardiac rhythm produced by administration of the test compound is recorded as the duration of antiarrhythmic activity. The termination of the period of normal activity is marked by the reappearance of ventricular tachycardia or fibrillation as indicated by the electrocardiogram observations. The change in mean arterial blood pressure and the change in rate of heartbeats per minute produced by the administration of the recorded antiarrhythmic dosage of test compound sufficient to bring about a complete conversion of the ouabain-induced tachycardia is recorded.

In these operations, 3-chloro-4-(2-dimethylaminoethoxy)-5-methoxyaniline hydrochloride is found to produce a complete conversion of ventricular tachycardia when administered intravenously at an antiarrhythmic dose of 0.50 milligram per kilogram, and the duration of antiarrhythmic activity observed with such dosage rate is greater than one hour. The administration of such antiarrhythmic dosage of the active compound is observed to produce an increase in mean arterial blood pressure of 3 millimeters of mercury and a decrease in heartbeat rate of 36 beats per minute as compared to the blood pressure and heartbeat observed during the arrhythmatic condition prior to administration of the compound. Similar results have been observed with compounds known to be useful as antiarrhythmic agents. (Lucchesi et al., J. Pharmacol. Exptl. Therap., 132, 372, 1961.)

EXAMPLE 2

In other representative operations carried out by the procedure of Example 1, 3-bromo-4-(2-diethylaminoethoxy)-5-methoxyaniline hydrochloride is found to produce a complete conversion of ouabain-induced ventricular tachycardia in dogs when administered intravenously at an antiarrhythmic dose of 0.5 milligram per kilogram. The duration of antiarrhythmic activity observed with such dosage rate is 32 seconds. The administration of such antiarrhythmic dosage of the active compound is observed to produce a decrease in mean arterial blood pressure of 10 millimeters of mercury and a decrease in heartbeat rate of 36 beats per minute as compared to the blood pressure and heartbeat observed during the arrhythmatic condition prior to administration of the compound.

EXAMPLE 3

Ten grams of 3-chloro-4-(2-dimethylaminoethoxy)-5-methoxyaniline picrate, 4 grams of 3-chloro-4-(2-N-ethyl-N-methylaminoethoxy)-5-methoxyaniline, 60 grams of milk sugar, 5 grams of magnesium stearate and 20 grams of corn starch are intimately mixed together in conventional mixing apparatus. The mixture is filled into gelatin capsules in the amount of 0.4 gram per capsule. The capsules are thus adapted to provide a maintenance antiarrhythmic dosage of 60 milligrams of the active substituted anilines to arrhythmic mammals.

Ten grams of 3-chloro-4-(2-diethylaminoethoxy)-5-methoxyaniline hydrobromide, 40 grams of lactose, 45 grams of starch and 5 grams of powdered tragacanth are mixed intimately in conventional mixing apparatus. The mixture is filled into gelatin capsules in the amount of 200 milligrams per capsule and the capsules are then administered orally to mammals to combat cardiac arrhythmia.

EXAMPLE 4

Two grams of 3-chloro-4-(2-dimethylaminoethoxy)-5-methoxyaniline hydrochloride are dissolved in 100 cubic centimeters of normal saline solution containing 0.5 percent of chlorobutanol as a preservative. The solution is filtered, filled into vials, sealed and sterilized in an autoclave to obtain a sterile injectable composition. One cubic centimeter of the composition contains about 20 milligrams of the active ingredient. The composition is administered to animals exhibiting cardiac arrhythmia.

What is claimed is:

1. The method which comprises administering internally to a cardiac arrhythmic mammal an antiarrhythmic amount of a (dialkylaminoethoxy)halomethoxyaniline or a pharmaceutically-acceptable salt thereof, the (dialkylaminoethoxy)halomethoxyaniline corresponding to the formula

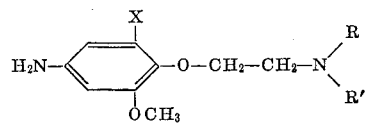

wherein X represents chlorine or bromine and R and R' each independently represent methyl or ethyl.

2. The method of claim 1 wherein X represents chlorine.

3. The method of claim 1 wherein R and R' both represent methyl.

4. The method of claim 1 wherein X represents chlorine and R and R' both represent methyl.

5. The method of claim 1 wherein the (dialkylaminoethoxy)halomethoxyaniline is administered parenterally.

6. The method of claim 5 wherein the (dialkylaminoethoxy)halomethoxyaniline is administered intravenously.

7. The method of claim 1 wherein the (dialkylaminoethoxy)halomethoxyaniline is administered orally.

References Cited

UNITED STATES PATENTS

| | | | |
|---|---|---|---|
| 3,389,171 | 6/1968 | White et al. | 260—501.17 |
| 3,419,591 | 12/1968 | Harrison | 260—440 |

ALBERT T. MEYERS, Primary Examiner

D. M. STEPHENS, Assistant Examiner

U.S. Cl. X.R.

260—570.7

PO-1050
(5/69)

UNITED STATES PATENT OFFICE
CERTIFICATE OF CORRECTION

Patent No. 3,632,779              Dated  4 January 1972

Inventor(s)   Franklin N. Marshall

It is certified that error appears in the above-identified patent and that said Letters Patent are hereby corrected as shown below:

Column 1, after "apparent" in line 44 and before "claims." in line 45 insert --upon consideration of the following specification and --.

Signed and sealed this 27th day of June 1972.

(SEAL)
Attest:

EDWARD M. FLETCHER, JR.
Attesting Officer

ROBERT GOTTSCHALK
Commissioner of Patents